(12) United States Patent
Fischetti et al.

(10) Patent No.: US 8,221,057 B2
(45) Date of Patent: Jul. 17, 2012

(54) METHOD, SYSTEM AND CONTROLLER FOR ESTABLISHING A WHEEL SPACE TEMPERATURE ALARM IN A TURBOMACHINE

(75) Inventors: Thomas Joseph Fischetti, Simpsonville, SC (US); Randy Scott Rosson, Simpsonville, SC (US); Kevin Wood Wilkes, Greenville, SC (US)

(73) Assignee: General Electric Company, Schenectady, NY (US)

( * ) Notice: Subject to any disclaimer, the term of this patent is extended or adjusted under 35 U.S.C. 154(b) by 980 days.

(21) Appl. No.: 12/145,735

(22) Filed: Jun. 25, 2008

(65) Prior Publication Data

US 2009/0324389 A1    Dec. 31, 2009

(51) Int. Cl.
*F01B 25/04*    (2006.01)
(52) U.S. Cl. .......................................... 415/118; 415/17
(58) Field of Classification Search ..................... 415/17, 415/118
See application file for complete search history.

(56) References Cited

U.S. PATENT DOCUMENTS

| | | | |
|---|---|---|---|
| 4,315,296 A | | 2/1982 | Hancock |
| 4,787,053 A * | 11/1988 | Moore ........................ 701/123 |
| 5,865,598 A * | 2/1999 | Twerdochlib ................ 415/118 |
| 6,719,526 B2 * | 4/2004 | Sanborn et al. .............. 415/118 |
| 7,853,392 B2 * | 12/2010 | Healey et al. ................. 701/100 |
| 2004/0037697 A1 | 2/2004 | Sanborn et al. |
| 2008/0059080 A1 * | 3/2008 | Greiner et al. ................. 702/33 |
| 2008/0221826 A1 * | 9/2008 | Johns et al. .................. 702/130 |
| 2009/0073731 A1 * | 3/2009 | Phadke et al. ................. 363/74 |
| 2009/0138228 A1 * | 5/2009 | Dalton et al. ................ 702/130 |
| 2009/0229288 A1 * | 9/2009 | Alston et al. .................. 62/236 |
| 2009/0273479 A1 * | 11/2009 | Waugh ......................... 340/584 |
| 2010/0034053 A1 * | 2/2010 | Fleure et al. ................... 367/50 |

FOREIGN PATENT DOCUMENTS

| | | |
|---|---|---|
| EP | 1835130 A2 | 9/2007 |
| EP | 1916391 A1 | 4/2008 |
| GB | 877127 | 9/1961 |

OTHER PUBLICATIONS

Extended European Search Report for corresponding EP Application No. 09163145.7-1267, dated Mar. 2, 2012, pp. 1-5.

* cited by examiner

*Primary Examiner* — Jerome Jackson, Jr.
*Assistant Examiner* — David Spalla
(74) *Attorney, Agent, or Firm* — Cantor Colburn LLP

(57) ABSTRACT

A method of establishing a wheel space temperature alarm in a turbomachine includes calculating an expected wheel space temperature based on operating conditions, measuring an actual wheel space temperature, and signaling an over temperature condition if the actual wheel space temperature exceeds the expected wheel space temperature.

6 Claims, 3 Drawing Sheets

METHOD, SYSTEM AND CONTROLLER FOR ESTABLISHING A WHEEL SPACE TEMPERATURE ALARM IN A TURBOMACHINE

BACKGROUND OF THE INVENTION

Exemplary embodiments of the invention pertain to the art of turbomachines and, more particularly, to a method of establishing wheel space temperature alarms in a turbomachine.

Combustion turbines include a compressor having a plurality of stages that create a compressed airflow and a turbine having a turbine rotor that drives a shaft. During operation, temperatures at the turbine rotor rise significantly. Cooling is provided by directing compressor discharge air into a wheel space that extends about the turbine rotor. Wheel space temperature is maintained at a material limit between compressor discharge temperature and hot gas path temperature. In the event that the wheel space temperature exceeds the material limit, an alarm is sounded to indicate an over temperature condition. When the material limit is exceeded, the turbomachine is shut down and bore plugs are removed to provide additional cooling flow. Various factors can affect compressor discharge air temperature. For example, as ambient inlet air temperature rises, compressor discharge air rises. Conventional wheel space temperature monitors establish a single non-flexible material limit that does not take into account changes in ambient temperature or operating parameters.

BRIEF DESCRIPTION OF THE INVENTION

In accordance with one exemplary embodiment of the invention, a method of establishing a wheel space temperature alarm in a turbomachine includes calculating an expected wheel space temperature based on operating conditions, measuring an actual wheel space temperature, and signaling an over temperature condition if the actual wheel space temperature exceeds the expected wheel space temperature.

In accordance with another exemplary embodiment of the invention, a system for establishing a wheel space temperature alarm in a turbomachine includes a central processing unit (CPU) interconnected functionally via a system bus to an input/output (I/O) adapter connecting to at least one of a removable data storage device, a program storage device, and a mass data storage device, a user interface adapter connecting to a keyboard and a mouse, a display adapter connecting to a display device, and at least one memory device thereupon stored a set of instructions. The set of instructions, when executed by the CPU, causes the system to calculate an expected wheel space temperature based on operating conditions, measure an actual wheel space temperature, and signal an over temperature condition if the actual wheel space temperature exceeds the expected wheel space temperature In accordance with yet another exemplary embodiment of the invention, a controller includes a computer useable medium including a computer readable program. The computer readable program, when executed, calculates an expected wheel space temperature based on operating conditions, measures an actual wheel space temperature, and signals an over temperature condition if the actual wheel space temperature exceeds the expected wheel space temperature.

Additional features and advantages are realized through the techniques of exemplary embodiments of the present invention. Other embodiments and aspects of the invention are described in detail herein and are considered a part of the claimed invention. For a better understanding of the invention with advantages and features thereof, refer to the description and to the drawings.

DETAILED DESCRIPTION OF THE INVENTION

Figure 1:
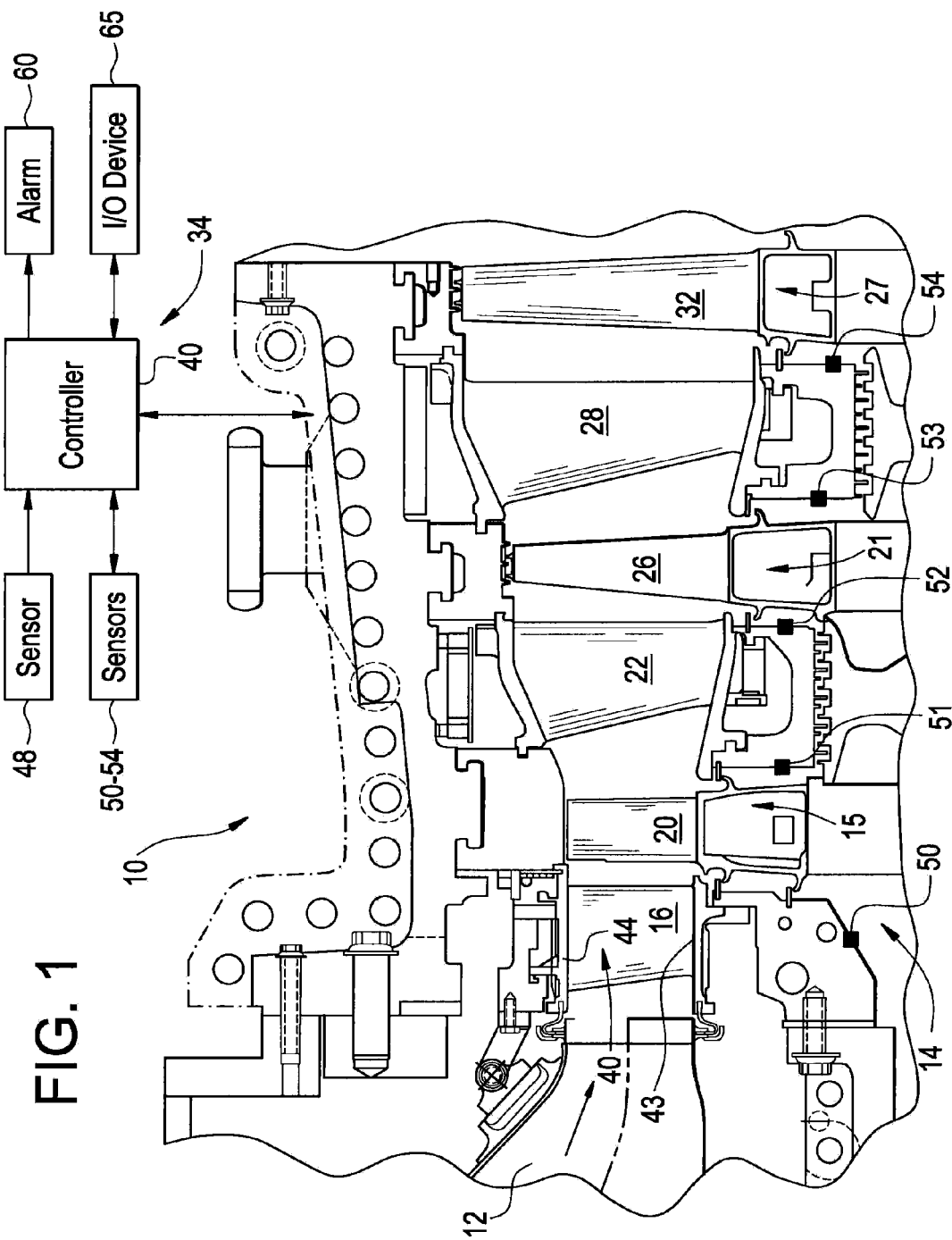
FIG. 1 is a cross-sectional schematic view of a turbine section of a turbomachine including a system for establishing a wheel space temperature alarm in accordance with an exemplary embodiment of the invention.

With initial reference to FIG. 1, a gas turbine engine constructed in accordance with an exemplary embodiment of the invention is indicated generally at 10. Turbine engine 10 includes an axial flow path 12 that leads to a wheel space 14 within which are positioned a plurality of turbine stages employing buckets and nozzles. As shown, turbine engine 10 includes a first turbine stage 15 having a first stage nozzle 16 and a first stage bucket 20, a second turbine stage 21 having a second stage nozzle 22 and a second stage bucket 26, and a third turbine stage 27 including a third stage nozzle 28 and a third stage bucket 32. Each turbine stage 15, 21 and 27 is connected to a turbine wheel (not shown). Of course it should be realized that turbine 10 includes additional turbine stages having associated nozzles and buckets (not shown).

Turbine 10 includes a system for establishing a wheel space temperature alarm indicated generally at 34. System 34 includes a controller 40 that, as will be discussed below, determines an over temperature condition in wheel space 14 based, at least in part, on a calculated expected wheel space temperature that reflects current operating conditions compared with actual wheel space temperatures. Towards that end, controller 40 is linked to an ambient temperature sensor 48 and a plurality of wheel space temperature sensors 50-54. In accordance with exemplary embodiments of the invention, each temperature sensor 48 and 50-54 is in the form of a thermocouple; however it should be understood that various types of temperature sensing devices could be employed without departing from the spirit of the invention. In addition, controller 40 is linked to an alarm 60 and an input/output (I/O) device 65 that provides a user interface enabling programming, data recording and the like.

Figure 2:
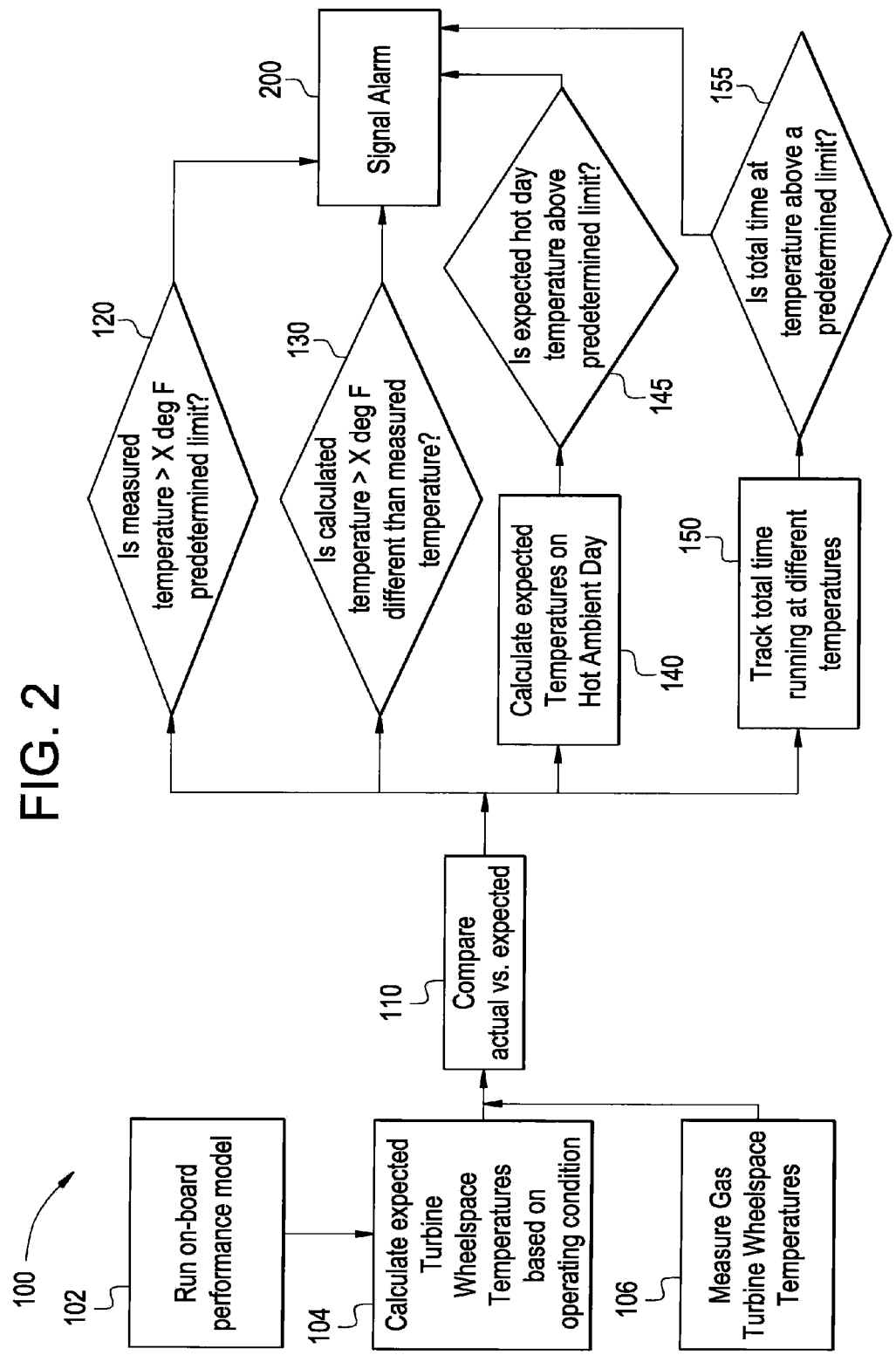
FIG. 2 is a flow chart illustrating a method of establishing a wheel space temperature alarm in accordance with an exemplary embodiment of the invention.

Reference will now be made to FIG. 2 in describing a method 100 of establishing a wheel space temperature alarm for turbine 10. As shown, an on-board performance model is run as indicated in block 102. The on-board performance model is a thermodynamic model of gas turbine 10 that measures engine data and adapts operating parameters to match measured parameters over time. In this manner, the on-board performance model evaluates and predicts operating parameters/conditions not capable of direct measurement. At this point, controller 40 calculates an expected wheel space temperature based on current operating conditions as indicated in block 104. Controller 40 evaluates ambient air temperature from sensor 48 load conditions as well as historical data/trends to determine an expected wheel space temperature based on the existing operating conditions for turbine 10. Controller 40 also determines actual wheel space temperatures via sensors 50-54 as indicated in block 106. At this point, the actual temperature obtained in block 106 is compared to the expected/calculated temperate obtained in block 104 as indicated in block 110.

After comparing the actual and expected/calculate temperatures in block 110, a determination is made whether an over-temperature alarm should be signaled. More specifically, in block 120 a determination is made whether the measured temperature obtained in block 106 exceeds a predetermined limit. In accordance with exemplary aspects of the invention, the predetermined limit will vary. Various factors such as, but not limited to, engine model and wheel space, will contribute to establishing the predetermined limit. In block 130 a determination is made whether the expected/calculated temperature is greater than the measured temperature by a defined amount. In accordance with exemplary aspects of the invention, the defined amount will vary. Various factors such as, but not limited to, site location will contribute to establishing an acceptable deviation from the expected/calculated temperature. In block 140, expected temperatures are calculated for a defined hot day, and a determination is made in block 145 whether the expected/calculated temperature for the hot day is above a predetermined limit. Of course temperature levels that define a hot day and the predetermined limit will vary based on, for example, engine location, load and the like. In addition, limits for temperatures sensed by each sensor 50-54 could vary depending upon sensor location. In block 150, total operating time at various temperatures is tracked, and a determination is made in block 155 whether total time at a particular temperature(s), what temperature(s), is above a predetermined limit. If any of the conditions determined in blocks 120, 130, 145 and 155 is positive, then an over-temperature alarm is signaled in block 200. At this point, remedial measures are taken to adapt operating conditions to the out-of-parameter wheel space temperatures. For example, additional cooling air can be directed into the wheel space to return the temperature to in-parameter ranges.

By comparing actual temperatures against predetermined limits and against calculated expected temperatures based on current operating conditions, as well as tracking run time at various temperature conditions, alerts indicating an over temperature condition more closely reflect real-time operating conditions. More specifically, by predicting hot day temperatures on colder days and tracking run time at a particular temperature or within a temperature range, exemplary embodiments of the invention establish over temperature alerts based on probabilistic limits rather than hard/fixed single point limits that do not account for variations in ambient temperatures. In this manner, exemplary embodiments of the present invention reduce operating costs by predicting when cooling air may be required for the turbine and also reduce preventative maintenance operations to an as needed basis.

At this point it should be understood that the capabilities of the present invention could be implemented in software, firmware, hardware or some combination thereof. As one example, controller 40 can take the form of appropriate high-powered solid-state switching device. In the exemplary embodiment shown, controller 40 is represented as a central processing unit or CPU. However, this is merely exemplary of an appropriate high-powered control, which is within the scope of the invention. For example but not limiting of the invention, the controller 40 may include at least one of a silicon controlled rectifier (SCR), a thyristor, MOS-controlled thyristor (MCT) and an insulated gate bipolar transistor. It will be appreciated by those skilled in the art that the controller 40 can also be implemented using a variety of separate dedicated or programmable integrated or other electronic circuits or devices, such as hardwired electronic or logic circuits including discrete element circuits or programmable logic devices, such as PLDs, PALs, PLAs or the like.

Figure 3:
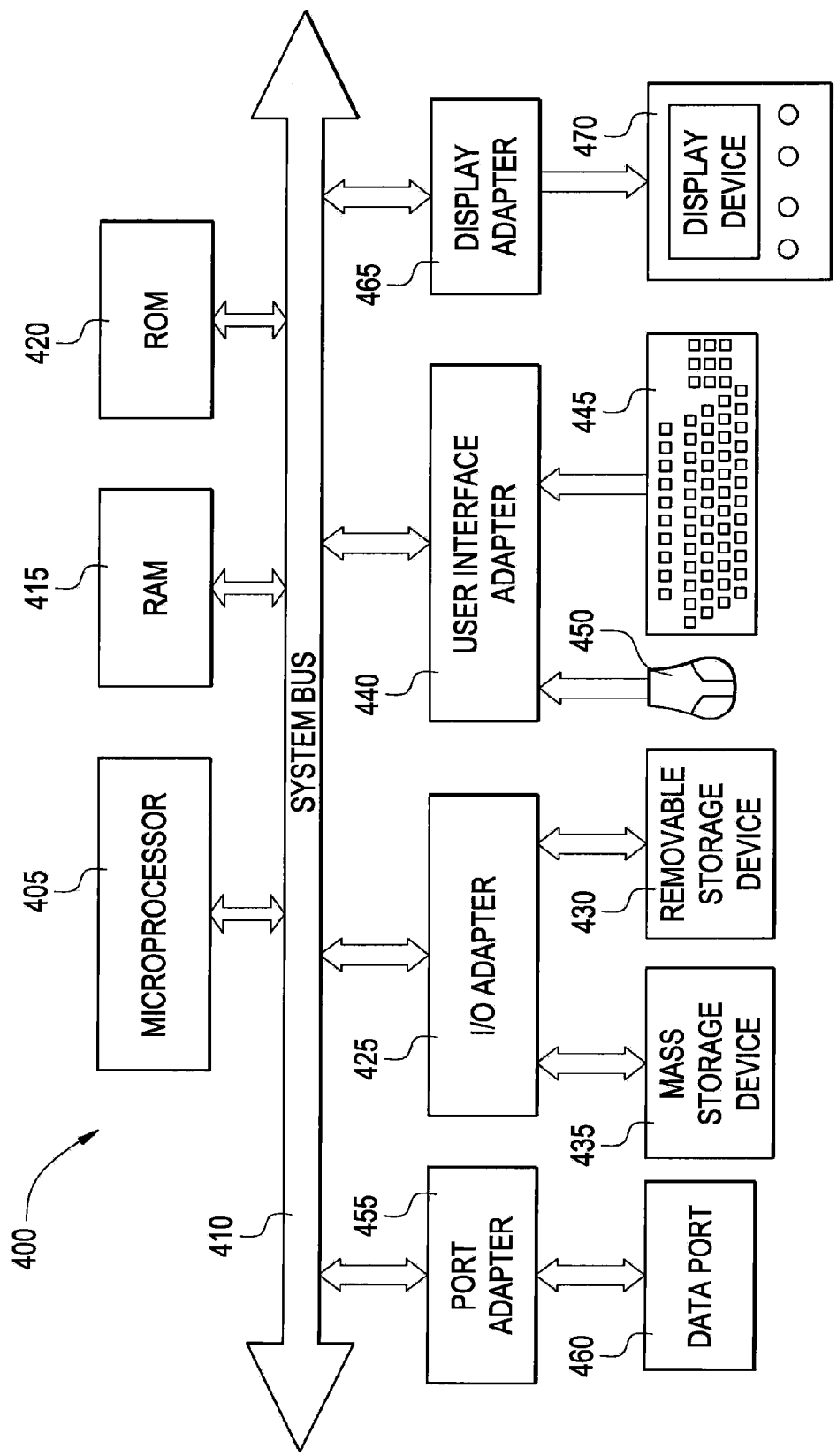
FIG. 3 is a schematic block diagram of a general-purpose computer suitable for practicing the present invention exemplary embodiments.

Controller 40 can also be implemented using a suitably programmed general-purpose computer, such as a microprocessor or microcontrol, or other processor device, such as illustrated at 400 in FIG. 3. Computer 400 includes at least one microprocessor or central processing unit (CPU) 405. CPU 405 is interconnected via a system bus 410 to a random access memory (RAM) 415, a read-only memory (ROM) 420, an input/output (I/O) adapter 425 for a connecting a removable data and/or program storage device 430 and a mass data and/or program storage device 435, a user interface adapter 440 for connecting a keyboard 445 and a mouse 450, a port adapter 455 for connecting a data port 460 and a display adapter 465 for connecting a display device 470.

ROM 420 contains the basic operating system for computer system 400. The operating system may alternatively reside in RAM 415 or elsewhere as is known in the art. Examples of removable data and/or program storage device 430 include magnetic media such as floppy drives and tape drives and optical media such as CD ROM drives. Examples of mass data and/or program storage device 435 include hard disk drives and non-volatile memory such as flash memory. In addition to keyboard 445 and mouse 450, other user input devices such as trackballs, writing tablets, pressure pads, microphones, light pens and position-sensing screen displays may be connected to user interface 440. Examples of display devices include cathode-ray tubes (CRT) and liquid crystal displays (LCD).

A computer program with an appropriate application interface may be created by one of skill in the art and stored on the system or a data and/or program storage device to simplify the practicing of this invention. In operation, information for or the computer program created to run the present invention is loaded on the appropriate removable data and/or program storage device 430, fed through data port 460 or typed in using keyboard 445. In general, any device or similar devices on which a finite state machine capable of implementing the flow charts, as illustrated in the application can be used as the control. As shown a distributed processing architecture is a preferred for maximum data/signal processing capability and speed.

In addition, it should be understood that the flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

As a result of the summarized invention, technically we have achieved a solution that enables flexible tracking of wheel space temperatures in a turbomachine. By comparing actual temperatures against calculated expected temperatures based on operating conditions, alerts indicating an over temperature condition more closely reflect real-time operating conditions. More specifically, by predicting hot day temperatures on colder days and tracking run time at a particular temperature or temperature range, exemplary embodiments of the present invention establish over temperature alerts based on probabilistic limits rather than hard/fixed single point limits that do not account for variations in ambient temperatures. In this manner, the exemplary embodiments of the invention reduce operating costs by predicting when cooling air may be required for the turbine and also reduces preventative maintenance operations to an as needed basis.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the present invention if they have structural elements that do not differ from the literal language of the claims, or if they include equivalent structural elements with insubstantial differences from the literal language of the claims.

The invention claimed is:

1. A method of establishing a wheel space temperature alarm in a turbomachine, the method comprising:
    calculating an expected wheel space temperature based on cycle conditions;
    measuring an actual wheel space temperature;
    determining a turbomachine run time at each of a plurality of wheel space temperatures;
    establishing a run time limit for each of the plurality of wheel space temperatures; and
    signaling the over temperature condition if the turbomachine exceeds the run time limit for one of the plurality of wheel space temperatures.

2. The method of claim 1, further comprising:
    establishing a predetermined material limit for the wheel space; and
    signaling the over temperature condition if the actual temperature exceeds the predetermined material limit.

3. A system for establishing a wheel space temperature alarm in a turbomachine, the system comprising:
    a controller interconnected functionally via a system bus to:
    an input/output (I/O) adapter connecting to at least one of a removable data storage device, a program storage device, and a mass data storage device;
    a user interface adapter connecting to a keyboard and a mouse;
    a display adapter connecting to a display device; and
    at least one memory device thereupon stored a set of instructions which, when executed by the controller, causes the system to:
        calculate an expected wheel space temperature based on operating conditions;
        measure an actual wheel space temperature;
        determine a turbomachine run time at each of a plurality of wheel space temperatures;
        establish a run time limit for each of the plurality of wheel space temperatures; and
        signal the over temperature condition if the turbomachine exceeds the run time limit for one of the plurality of wheel space temperatures.

4. The system of claim 3, wherein the set of instructions which, when executed by the controller, causes the system to:
    establish a predetermined material limit for the wheel space; and
    signal the over temperature condition if the actual temperature exceeds the predetermined material limit.

5. A controller comprising:
    a computer useable medium including a computer readable program, wherein the computer readable program when executed:
        calculates an expected wheel space temperature based on operating conditions;
        measures an actual wheel space temperature;
        determines a turbomachine run time at each of a plurality of wheel space temperatures;
        establishes a run time limit for each of the plurality of wheel space temperatures; and
        signals the over temperature condition if the turbomachine exceeds the run time limit for one of the plurality of wheel space temperatures.

6. The controller according to claim 5, wherein the computer readable program when executed:
    establishes a predetermined material limit for the wheel space; and
    signals the over temperature condition if the actual temperature exceeds the predetermined material limit.

* * * * *